US012182907B1

United States Patent
Zhao et al.

(10) Patent No.: US 12,182,907 B1
(45) Date of Patent: Dec. 31, 2024

(54) THEMATIC MAP PREPARATION METHOD AND APPARATUS, STORAGE MEDIUM AND ELECTRONIC DEVICE

(71) Applicant: Northwest Institute of Eco-Environment and Resources, Chinese Academy of Sciences, Gansu (CN)

(72) Inventors: Guohui Zhao, Lanzhou (CN); Yaonan Zhang, Lanzhou (CN)

(73) Assignee: Northwest Institute of Eco-Environment and Resources, Chinese Academy of Sciences, Lanzhou (CN)

( * ) Notice: Subject to any disclaimer, the term of this patent is extended or adjusted under 35 U.S.C. 154(b) by 0 days.

(21) Appl. No.: 18/798,947

(22) Filed: Aug. 9, 2024

(51) Int. Cl.
*G06F 17/00* (2019.01)
*G06T 7/90* (2017.01)
(Continued)

(52) U.S. Cl.
CPC .............. *G06T 11/001* (2013.01); *G06T 7/90* (2017.01); *G06T 11/60* (2013.01); *G06T 2207/10024* (2013.01)

(58) Field of Classification Search
CPC ......... G06T 11/001; G06T 7/90; G06T 11/60; G06T 2207/10024; G06F 16/285;
(Continued)

(56) References Cited

U.S. PATENT DOCUMENTS 7,756,831 B1    7/2010  Rao
9,818,211 B1 *  11/2017 Gibb .................... G06T 11/206
(Continued)

FOREIGN PATENT DOCUMENTS

CN    101593209 A    12/2009
CN    108628895 A    10/2018
(Continued)

OTHER PUBLICATIONS

China State Intellectual Property Office, First Office Opinion Notice, Application No. 202311014115.1, Jan. 25, 2024, 8 pages.
(Continued)

*Primary Examiner* — Jason T Edwards
(74) *Attorney, Agent, or Firm* — Ziegler IP Law Group LLC.

(57) ABSTRACT

Thematic map preparation method and apparatus, a storage medium and an electronic device are provided. The method includes: preparing a map style master based on an aimed application field; generating metadata information corresponding to the map style master, wherein the metadata information includes a mapping relationship between each of the geographical units in the map style master and the initial color identification corresponding thereto, and the metadata information further includes location information about the legend in the map style master; processing original input data, and acquiring an attribute color identification of each geographical unit in the original input data; and replacing the initial color identification corresponding to each of the geographical units in the map style master with the attribute color identification, and updating the legend, so as to obtain a thematic map of the original input data when aimed at the application field.

12 Claims, 2 Drawing Sheets

(51) Int. Cl.
*G06T 11/00* (2006.01)
*G06T 11/60* (2006.01)

(58) Field of Classification Search
CPC .... G06F 16/9535; G06Q 10/06; G06Q 50/06; G01C 15/00
USPC ........................................................ 715/204
See application file for complete search history.

(56) References Cited

U.S. PATENT DOCUMENTS

| | | | |
|---|---|---|---|
| 2007/0043529 A1* | 2/2007 | Johnson ............. | G01C 21/3807 702/150 |
| 2008/0120122 A1* | 5/2008 | Olenski ................. | G06Q 10/06 705/1.1 |
| 2009/0285479 A1 | 11/2009 | Hosaki | |
| 2014/0280180 A1* | 9/2014 | Edecker ................ | G06F 16/285 707/769 |
| 2015/0070733 A1 | 3/2015 | Bernardo | |
| 2015/0379733 A1 | 12/2015 | Dorner et al. | |

FOREIGN PATENT DOCUMENTS

| | | |
|---|---|---|
| CN | 109002452 A | 12/2018 |
| CN | 111506685 A | 8/2020 |
| CN | 116263984 A | 6/2023 |
| CN | 116993857 A | 11/2023 |
| JP | 2019101769 A | 6/2019 |

OTHER PUBLICATIONS

China State Intellectual Property Office, Notice of Grant of Invention Patent, Application No. 202311014115.1, Mar. 9, 2024, 4 pages.

Zhang, Shujun, et al., Specification Design and Application of Earthquake Emergency Thematic Map in Taiwan based on GIS, South China Journal of Seismology, vol. 43, No. 1, Mar. 2023, 10 Pages.

China National Intellectual Property Administration, Application No. 20231114115.1, mailed Mar. 9, 2024, 1 page, English Translation 1 page.

* cited by examiner

THEMATIC MAP PREPARATION METHOD AND APPARATUS, STORAGE MEDIUM AND ELECTRONIC DEVICE

CROSS-REFERENCE TO RELATED APPLICATION

The present disclosure claims the priority to the Chinese patent application filed with the China National Intellectual Property Administration on Oct. 11, 2023 with the filing No. 202311014115.1 and entitled "THEMATIC MAP PREPARATION METHOD AND APPARATUS, STORAGE MEDIUM AND ELECTRONIC DEVICE", the content of which is incorporated herein by reference in entirety.

TECHNICAL FIELD

The present disclosure relates to the field of big data, and specifically to thematic map preparation method and apparatus, a storage medium and an electronic device.

BACKGROUND ART

In the background of big data, data have become the fundamental strategic resources and play an increasingly important role in all walks of life. However, the existing data materials are of various types and complex structures and usually scattered in different departments, organizations and individuals, which brings great inconvenience to management and application of data, especially of unstructured data. How to effectively carry out conjoint analysis and fusion computing to enable these data resources to produce maximum benefit has become a difficult problem that needs to be solved urgently by current big data management and intelligent analysis.

The fundamental work of big data management is to organize and fuse aggregated multi-source heterogeneous data resources. Fusing multi-source heterogeneous data refers to integrate contents of data from different sources and of different types, different scales and different structures, so as to obtain more comprehensive, more accurate and more complete information, which has the advantages including: (1) improving data reliability and accuracy; (2) improving temporal-spatial resolution of data and information richness, and better reflecting actual situation; and (3) improving comprehensive utilization value of data, and better supporting data application and decision. Therefore, fusion of multi-source heterogeneous data is an important method and process for big data processing.

Mapping (drawing, map-making) is an important means for data analysis, application and sharing, wherein thematic map is a carrier for expressing information contained in data and presenting distribution pattern and association rules of objects. It is a map that graphically presents data information, intuitively and clearly shows spatial distribution and association features of objects or phenomena by means of graphics, symbols, colors, etc., and emphasizes a certain natural or social-economic subject. It is featured by intuitiveness, visualization, understandability, and the like, and has important application value in production and living, mainly embodied in two aspects: (1) information transfer and sharing: enhancing readability and propagation effects of data, facilitating cross-field communication and sharing, and promoting scientific communication, cooperation and popularization; and (2) data comprehension and application: improving readability and comprehensibility of data contents, enabling people to better learn and master temporal-spatial changes and inherent relations of geographical phenomena, facilitating discovering rules and trends in data, helping managers make better decisions and effectively avoid risks. Therefore, the thematic map has become an indispensable tool in our daily life. With the development of science and technology and enrichment of data, thematic map preparation methods urgently need to be updated and improved.

SUMMARY

The present disclosure aims at providing thematic map preparation method and apparatus, a storage medium and an electronic device, so as to at least partially address the above problems.

In order to achieve the above objectives, embodiments of the present disclosure adopt technical solutions as follows.

In the first aspect, the embodiments of the present disclosure provide a thematic map preparation method, wherein the method includes:

preparing a map style master based on an aimed application field,
wherein the map style master includes at least one geographical unit in a target region corresponding to the application field and a legend, and initial color identifications corresponding to different geographical units are different;
generating metadata information corresponding to the map style master,
wherein the metadata information includes a mapping relationship between each of the geographical units in the map style master and the initial color identification corresponding thereto, and the metadata information further includes location information about the legend in the map style master;
processing original input data, and acquiring an attribute color identification of each of the geographical units in the original input data,
wherein the attribute color identifications are reference objects corresponding to the application field; and
replacing the initial color identifications corresponding to each of the geographical units in the map style master with the attribute color identification, and updating the legend, so as to obtain a thematic map of the original input data when aimed at the application field.

In the second aspect, the embodiments of the present disclosure provide a thematic map preparation apparatus, wherein the apparatus includes: a first processing unit and a second processing unit, wherein the first processing unit is configured to prepare a map style master based on an aimed application field,
wherein the map style master includes at least one geographical unit in a target region corresponding to the application field and a legend, and initial color identifications corresponding to different geographical units in the map style master are different;
the first processing unit is further configured to generate metadata information corresponding to the map style master,
wherein the metadata information includes a mapping relationship between each of the geographical units in the map style master and the initial color identification corresponding thereto, and the metadata information further includes location information about the legend in the map style master;

the first processing unit is further configured to process original input data, and acquire an attribute color identification of each of the geographical units in the original input data, wherein the attribute color identifications are reference objects corresponding to the application field; and the second processing unit is configured to replace the initial color identifications corresponding to each of the geographical units in the map style master with the attribute color identification, and update the legend, so as to obtain a thematic map of the original input data when aimed at the application field.

In the third aspect, the embodiments of the present disclosure provide a storage medium, which stores a computer program thereon, and the computer program, when executed by a processor, implements the above method.

In the fourth aspect, the embodiments of the present disclosure provide an electronic device, wherein the electronic device includes: a processor and a memory, and the memory is configured to store one or more programs; and the one or more programs, when executed by the processor, implements the above method.

Compared with the prior art, the embodiments of the present disclosure provide the thematic map preparation method and apparatus, the storage medium and the electronic device. The method includes: preparing a map style master based on an aimed application field, wherein the map style master includes at least one geographical unit in a target region corresponding to the application field and a legend, and different geographical units in the map style master are corresponding to different initial color identifications; generating metadata information corresponding to the map style master, wherein the metadata information includes a mapping relationship between each geographical unit in the map style master and the initial color identification corresponding thereto, and the metadata information further includes location information about the legend in the map style master; processing original input data, and acquiring an attribute color identification of each geographical unit in the original input data, wherein the attribute color identifications are reference objects corresponding to the application field; and replacing the initial color identification corresponding to each geographical unit in the map style master with the attribute color identification, and updating the legend, so as to obtain the thematic map of the original input data when aimed at the application field. The present disclosure reduces repeated labor, ensures drawing of high-quality and high-standard thematic maps, and has unique advantages in reliability, consistency, comparability, currency and continuity.

In order to make the above objectives, features and advantages of the present disclosure more obvious and understandable, detailed description is made below particularly with preferred embodiments in conjunction with accompanying drawings.

BRIEF DESCRIPTION OF DRAWINGS

In order to more clearly illustrate technical solutions of embodiments of the present disclosure, drawings which need to be used in the embodiments will be briefly introduced below. It is to be understood that the drawings merely show some embodiments of the present disclosure, and thus should not be considered as limitation to the scope. Those ordinarily skilled in the art still could obtain other relevant drawings according to these drawings, without using inventive efforts.

Figure 1:
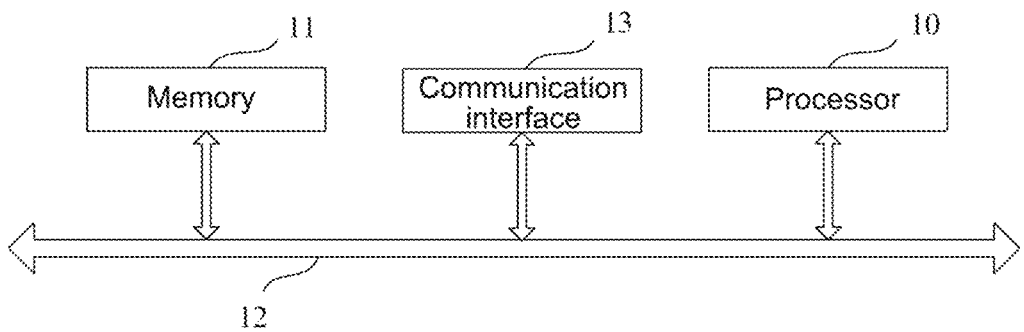
FIG. 1 is a structural schematic diagram of an electronic device provided in embodiments of the present disclosure.

In the drawings: 10—processor; 11—memory; 12—bus; 13—communication interface; 201—first processing unit; 202—second processing unit.

DETAILED DESCRIPTION OF EMBODIMENTS

In order to make the objectives, technical solutions and advantages of the embodiments of the present disclosure more clear, the technical solutions in the embodiments of the present disclosure will be clearly and completely described below in conjunction with the drawings of the embodiments of the present disclosure. Apparently, the embodiments described are some but not all embodiments of the present disclosure. Generally, components in the embodiments of the present disclosure described and shown in the drawings herein may be arranged and designed in various different configurations.

Therefore, the following detailed description of the embodiments of the present disclosure provided in the drawings is not intended to limit the claimed scope of the present disclosure, but merely represents chosen embodiments of the present disclosure. All of other embodiments obtained by those ordinarily skilled in the art based on the embodiments in the present disclosure without using inventive efforts shall fall within the scope of protection of the present disclosure.

It should be noted that like reference signs and letters represent like items in the following drawings, and thus, once a certain item is defined in one drawing, it is unnecessary to define the same in subsequent drawings. Meanwhile, in the description of the present disclosure, the terms such as "first" and "second" are merely used for distinguishing the description, but should not be construed as indicating or implying importance in the relativity.

It should be indicated that in the present disclosure, the relational terms such as first and second are merely used for distinguishing one entity or operation from another entity or operation, while it is not necessarily required or implied that these entities or operations have any such practical relation or order. Moreover, the terms such as "comprise", "contain" or any other variants thereof are intended to encompass non-exclusive inclusion, such that a process, a method, an article or a device including a series of elements includes not only those elements, but also includes other elements that are not explicitly listed, or further includes elements inherent in such process, method, article or device. In the absence of further limitations, an element specified by the phrase "comprising a . . . " does not exclude the presence of additional identical elements in the process, method, article or device that includes the specified element.

In the description of the present disclosure, it should be indicated that orientation or positional relationships indicated by the terms such as "upper", "lower", "inner", and "outer" are based on orientation or positional relationships as shown in the drawings, or orientation or positional relationships of a product of the present disclosure when being conventionally placed in use, merely for facilitating describing the present disclosure and simplifying the description, rather than indicating or implying that related devices or elements have to be in a specific orientation or configured and operated in a specific orientation, and thus they should not be construed as limitation to the present disclosure.

In the description of the present disclosure, it should be further indicated that, unless otherwise specifically regulated and defined, the terms "provide" and "connect" is to be understood in a broad sense, for example, a connection may be a fixed connection, a detachable connection, or an integrated connection; it may be a mechanical connection or an electrical connection; it may be direct joining, indirect joining through an intermediary, or inner communication between two elements. Specific meanings of the above terms in the present disclosure could be understood by those ordinarily skilled in the art according to specific situations.

Some implementation modes of the present disclosure are described in detail below in conjunction with the drawings. The following embodiments and the features in the embodiments may be combined with each other without conflict.

In an optional scenario, thematic maps can be drawn by technicians interactively with the help of mapping software, and can flexibly express thoughts and ideas of cartographers, in which some innovations and variations in graphics and symbols can be made. However, this method demands high knowledge background and professional software operating capability for cartographers; special mapping software and hardware environments and technicians need to be provided, and the cost is high; interaction process is time-consuming and labor-intensive, and mapping period is long; collaboration is difficult, expression modes are limited, and there may be deviations and irregularities in the presentation of information; modification is not easy and update is difficult; and degree of automation is not high, and manual intervention is required.

In addition, as manually prepared thematic maps are inundated with a large number of personalized elements, it is difficult to compare and analyze maps of the same theme (subject) or the same object. Manually prepared thematic maps have the following shortcomings: (1) strong subjectivity and poor continuity: as cartographers are different, thematic maps made even with the same data are significantly different, resulting in that the subsequent maps cannot be easily compared or analyzed; (2) security risk: data and technology are all in the hands of cartographers, in cases of personnel change or other situations, it is adverse to modification and update of maps, innovation of technology, and so on, and there is also a question of data privacy and security.

In order to overcome the above problems, embodiments of the present disclosure provide a thematic map preparation method, wherein a thematic map is specifically prepared based on fusion of multi-source heterogeneous data. By "multi-source heterogeneous" herein, it means that preparation of a map style master comes from one department, team or individual, while attribute data usually come from other departments, teams or individuals, the two have different sources and different formats, and thus are multi-source heterogeneous, and the thematic map is formed after fusion of the two. It has the following characteristics: (1) diversification of data: multi-source heterogeneous data can be processed, ensuring rights and security of data; (2) automation of method: different application requirements can be automatically processed according to different application scenarios; and (3) diversity of contents: expression of spatial distribution characteristics, extended to dynamic monitoring, warning and forecasting, etc. Due to existence of general and individual demands, the thematic map preparation method further needs to have the characteristics of flexibility, compatibility and comprehensiveness, so as to meet practical requirements of application in different fields, and make it adapt to requirements of intelligent automatic mapping in the current environment of big data.

Embodiments of the present disclosure provide an electronic device, which may be a server device, a computer device, a mobile phone device and other terminal devices having computing and processing capabilities. Referring to FIG. 1, it is a structural schematic diagram of the electronic device. The electronic device includes a processor 10, a memory 11, and a bus 12. The processor 10 and the memory 11 are connected through the bus 12. The processor 10 is configured to execute an executable module, such as a computer program, stored in the memory 11.

The processor 10 may be an integrated circuit chip that can process signals. In an implementation process, various steps of the thematic map preparation method may be completed by an integrated logic circuit of hardware or instruction in a software form in the processor 10. The above processor 10 may be a general-purpose processor, including a central processing unit (CPU for short), a network processor (NP for short), etc., and may also be a digital signal processor (DSP for short), an application specific integrated circuit (ASIC for short), a field-programmable gate array (FPGA for short) or other programmable logic devices, discrete gates, transistor logic devices, or discrete hardware components.

The memory 11 may include a high-speed random access memory (RAM), and possibly also include a non-volatile memory, such as at least one disk memory.

The bus 12 may be an ISA (Industry Standard Architecture) bus, a PCI (Peripheral Component Interconnect) bus, an EISA (Extended Industry Standard Architecture) bus, or the like. The bus is only denoted by one bidirectional arrow in FIG. 1, but it does not mean that there is only one bus 12 or one type of bus 12.

The memory 11 is configured to store a program, for example, a program corresponding to a thematic map preparation apparatus. The thematic map preparation apparatus includes at least one software functional module that can be stored in the memory 11 in a form of software or firmware, or solidified in an operating system (OS) of the electronic device. The processor 10 executes, upon receipt of an execution instruction, the program so as to implement the thematic map preparation method.

Possibly, the electronic device provided in the embodiments of the present disclosure further includes a communication interface 13. The communication interface 13 is connected to the processor 10 through the bus.

The electronic device can be in communication connection with other terminals, such as a data source server, via the communication interface 13, and receive original input data transmitted from other terminals, where original input data transmitted by different terminals may be different.

It is to be understood that the structure shown in FIG. 1 is merely a structural schematic diagram of part of the electronic device, while the electronic device may further include more or fewer components than shown in FIG. 1, or have a configuration different from that shown in FIG. 1. Various components shown in FIG. 1 may be realized by hardware, software or a combination thereof.

Figure 2:
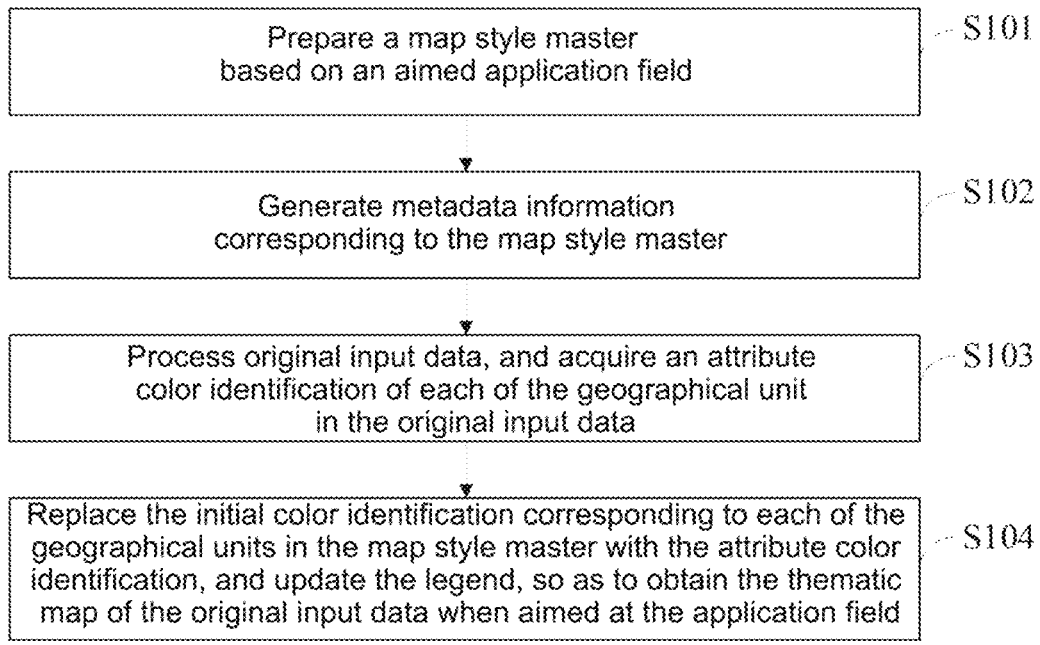
FIG. 2 is a schematic flowchart of a thematic map preparation method provided in embodiments of the present disclosure.

Embodiments of the present disclosure provide a thematic map preparation method, which is applicable to, but not limited to, the electronic device shown in FIG. 1. For a specific process, reference can be made to FIG. 2. The thematic map preparation method includes: S101, S102, S103 and S104, which are specifically described as follows.

S101, preparing a map style master based on an aimed application field.

In the above, the map style master includes at least one geographical unit in a target region corresponding to the application field and a legend, wherein initial color identifications corresponding to different geographical units in the map style master are different. The map style master can be stored in a form of a graph.

Optionally, the geographical units may be administrative regions or geographical landscapes. The geographical unit may be defined as a space unit formed by combining geographical elements together according to a certain scale and property.

With the enrichment of data resources and development of information technology, functions of thematic maps have been extended from original expression of spatial distribution features of objects and phenomena to application fields of spatial analysis, knowledge discovery, dynamic monitoring, comprehensive assessment, warning and forecasting and so on. In order to meet requirements of different application fields, S101 needs to be executed to prepare map style masters respectively corresponding to different application fields. In the above, for the same target region (for example, a certain province), when directed to different application fields, it may be divided into geographical units which are not completely the same, and/or legend titles in legends are not the same.

Optionally, the map style master needs to meet resolution requirements of the aimed application field, for example, the lowest resolution requirement or the highest resolution requirement in this application field.

Optionally, the legend includes a legend title, a legend label and a color bar, wherein the legend label includes a legend minimum-value label and a legend maximum-value label. In solutions of the present disclosure, the legend can be adjusted in font and color according to a legend configuration instruction input by users.

In an optional implementation mode, there are a plurality of types of map style masters, which are differentiated according to, for example, whether there is a compass, a scale, a coordinate grid, and geographical unit annotation, and are separately stored, with a name in a form as: region name_minimum geographical unit_master code_with or without compass_with or without scale_with or without coordinate grid_with or without annotation.extension.

Optionally, users can input a type configuration instruction to determine whether to have the compass, the scale, the coordinate grid, and the geographical unit annotation.

S102, generating metadata information corresponding to the map style master.

In the solutions of the present disclosure, the metadata information is location information and color information about each section (geographical unit and legend) in the map style master.

In the above, the metadata information includes a mapping relationship between each geographical unit in the map style master and the initial color identification corresponding thereto, and the metadata information further includes location information about the legend in the map style master.

Optionally, the metadata information may be corresponding to a plurality of different types of map style masters, and the metadata information is named in a way of taking names of the first three fields of its corresponding map style master, in a form as: region name_minimum geographical unit_master code.file extension.

In an optional implementation mode, a total number of the geographical units in the target region is N, where N≥1, the metadata information is a metadata table, a first type of default column corresponding to first N rows in the metadata table is configured to store mapping relationships between the initial color identifications of N geographical units, and name column of an ith row in the metadata table includes an identification of corresponding geographical unit, where 1≤i≤N.

A second type of default column corresponding to last four rows in the metadata table is configured to store the location information about the legend in the map style master. A third type of default column corresponding to the last four rows in the metadata table stores color information about the legend in the map style master.

Referring to following TABLE 1, in TABLE 1, Gansu province is taken as the target region, and municipal administrative units under jurisdiction of Gansu province are taken as the geographical units for illustrative description, which does not constitute limitation herein.

TABLE 1

| Jiayuguan City | 30 | 30 | 142 | 1E1E8E | 240 | 78 | 55 | 0 |
| Dingxi City | 39 | 171 | 70 | 27AB46 | 134 | 77 | 67 | 0 |
| Linxia Hui Autonomous Prefecture | 41 | 135 | 163 | 2987A3 | 193 | 74 | 63 | 0 |
| Jiuquan City | 42 | 80 | 129 | 2A5081 | 213 | 67 | 50 | 0 |
| Qingyang City | 54 | 73 | 176 | 3649B0 | 230 | 69 | 69 | 0 |
| Pingliang City | 66 | 160 | 124 | 42A07C | 157 | 58 | 62 | 0 |
| Lanzhou City | 67 | 128 | 59 | 43803B | 113 | 53 | 50 | 0 |
| Wuwei City | 104 | 156 | 32 | 689C20 | 85 | 79 | 61 | 0 |
| Longnan City | 109 | 64 | 129 | 6D4081 | 281 | 50 | 50 | 0 |
| Zhangye City | 134 | 70 | 42 | 86462A | 18 | 68 | 52 | 0 |
| Tianshui City | 140 | 32 | 32 | 8C2020 | 0 | 77 | 54 | 0 |
| Baiyin City | 154 | 32 | 151 | 9A2097 | 301 | 79 | 60 | 0 |
| Gannan Tibetan Autonomous Prefecture | 161 | 141 | 46 | A18D2E | 49 | 71 | 63 | 0 |
| Jinchang City | 172 | 50 | 89 | AC3259 | 340 | 70 | 67 | 0 |
| Legend Title | 3311 | 1368 | 3439 | 1946 | 0 | 0 | 0 | 0 |
| Legend Color Bar | 3465 | 460 | 3648 | 2819 | 0 | 0 | 0 | 0 |
| Legend Minimum-value Label | 3635 | 2822 | 3736 | 3002 | 0 | 0 | 0 | 0 |
| Legend Maximum-value Label | 3638 | 417 | 482 | 3759 | 0 | 0 | 0 | 0 |

As shown in TABLE 1, a value of N is 14, and the metadata table includes N+4=18 rows of valid contents. A first column in the metadata table is name column, and the name column of the ith row in the metadata table includes an identification of corresponding geographical unit, for example, Jiayuguan City and Dingxi City. The name column corresponding to the last four rows in the metadata table includes identifications (e.g. names) of the legend title, legend color bar, legend minimum-value label and legend maximum-value label, respectively.

The first type of default column corresponding to the first N rows in the metadata table may be second to fourth columns in the table, where the second to fourth columns correspond to RGB color characteristics, being red, green and blue in sequence. The first type of default column corresponding to the first N rows in the metadata table may be fifth column in the table, which is corresponding to hexadecimal color. The first type of default column corresponding to the first N rows in the metadata table may be sixth to ninth columns in the table, where the sixth to ninth columns are corresponding to hue, saturation, brightness and transparency in sequence. It should be noted that the same row indicates the mapping relationships between each other.

The second type of default column corresponding to the last four rows in the metadata table may be second to fifth columns in the table. Taking one object in the legend title, legend color bar, legend minimum-value label and legend maximum-value label as an example, the second column of any row in the last four rows is top left row number, top left column number, bottom right row number and bottom right column number of this object in the map style master. The third type of default column may be any one or more columns of sixth to eighth columns in the table.

S103, processing original input data, and acquiring an attribute color identification of each geographical unit in the original input data.

In the above, the attribute color identifications are reference objects corresponding to the application field.

With regard to contents in S103, the embodiments of the present disclosure further provide an optional implementation mode, and referring to the following, S103 includes: S103-1, S103-2, S103-3 and S103-4, which are specifically illustrated as follows.

S103-1, processing the original input data, and acquiring an attribute value of each geographical unit in the original input data.

In the above, the attribute values are reference values corresponding to the application field.

Optionally, a spatial range of the original input data must cover a geographical region in the map style master, and spatial resolution is not lower than the minimum geographical unit.

In the solutions of the present disclosure, the attribute values are corresponding to the legend title, and the legend title can be selected or input by users based on the application field, for example, if the legend title is GDP (100 million yuan), then the attribute value is GDP corresponding to each geographical unit.

In a possible implementation, the original input data are qualitative data, such as poor, medium, and good ratings, and then they are converted into digital representation forms, such as 1, 2 and 3 for representation, and corresponding attribute values are extracted based on the converted original input data. If the original input data are quantitative data, then they can be directly extracted. No matter how sources and structures of the original input data are different, formats of the extracted attribute values are uniform, so that the multi-source heterogeneous data can be processed.

S103-2, adding an attribute-value column into the metadata table, and adding the attribute values into the attribute-value column according to correspondence relationships, so as to obtain a first attribute table.

Referring to TABLE 2 below. TABLE 2 is the first attribute table corresponding to the above TABLE 1.

TABLE 2

| | | | | | | | | | |
|---|---|---|---|---|---|---|---|---|---|
| Jiayuguan City | 30 | 30 | 142 | 1E1E8E | 240 | 78 | 55 | 0 | 282 |
| Dingxi City | 39 | 171 | 70 | 27AB46 | 134 | 77 | 67 | 0 | 441 |
| Linxia Hui Autonomous Prefecture | 41 | 135 | 163 | 2987A3 | 193 | 74 | 63 | 0 | 331 |
| Jiuquan City | 42 | 80 | 129 | 2A5081 | 213 | 67 | 50 | 0 | 658 |
| Qingyang City | 54 | 73 | 176 | 3649B0 | 230 | 69 | 69 | 0 | 755 |
| Pingliang City | 66 | 160 | 124 | 42A07C | 157 | 58 | 62 | 0 | 476 |
| Lanzhou City | 67 | 128 | 59 | 43803B | 113 | 53 | 50 | 0 | 2887 |
| Wuwei City | 104 | 156 | 32 | 689C20 | 85 | 79 | 61 | 0 | 526 |
| Longnan City | 109 | 64 | 129 | 6D4081 | 281 | 50 | 50 | 0 | 452 |
| Zhangye City | 134 | 70 | 42 | 86462A | 18 | 68 | 52 | 0 | 467 |
| Tianshui City | 140 | 32 | 32 | 8C2020 | 0 | 77 | 54 | 0 | 667 |
| Baiyin City | 154 | 32 | 151 | 9A2097 | 301 | 79 | 60 | 0 | 497 |
| Gannan Tibetan Autonomous Prefecture | 161 | 141 | 46 | A18D2E | 49 | 71 | 63 | 0 | 359 |
| Jinchang City | 172 | 50 | 89 | AC3259 | 340 | 70 | 67 | 0 | 359 |
| Legend Title | 3311 | 1368 | 3439 | 1946 | 0 | 0 | 0 | 0 | GDP (100 million yuan) |
| Legend Color Bar | 3465 | 460 | 3648 | 2819 | 0 | 0 | 0 | 0 | 0 |
| Legend Minimum-value Label | 3635 | 2822 | 3736 | 3002 | 0 | 0 | 0 | 0 | 219 |
| Legend Maximum-value Label | 3638 | 417 | 482 | 3759 | 0 | 0 | 0 | 0 | 2887 |

Optionally, a tenth column in the first attribute table is the attribute-value column, and the attribute values can be filled in the attribute column of rows where corresponding geographical units are located.

Optionally, the attribute-value column of the last four rows in the first attribute table represent the legend title (input by users or automatically generated based on application field), whether the legend color bar using default color bar (which may also be understood as whether color bar rule being default color bar rule), minimum value of attribute values corresponding to the legend minimum-value label and maximum value of attribute values corresponding to the legend maximum-value label in sequence.

Optionally, when the attribute column corresponding to the legend color bar is 1, the legend color bar uses the default color bar, the color bar rule is the default color bar rule; and when the attribute column corresponding to the legend color bar is 0, the legend color bar uses a custom color bar, and the color bar rule is a custom color bar rule. A value in the attribute column corresponding to the legend color bar is a value input by users.

Optionally, a name of the first attribute table is the same as that of corresponding metadata table, or the same as that of corresponding map style master.

S103-3, determining the attribute color identification of each geographical unit based on a pre-configured color bar rule and the attribute value of each geographical unit in the first attribute table.

With regard to contents in S103-3, the embodiments of the present disclosure further provide an optional implementation mode. Referring to the following, when the pre-config-ured color bar rule is the default color bar rule, S103-3, the step of determining the attribute color identification of each geographical unit based on a pre-configured color bar rule and the attribute values of each geographical unit in the first attribute table, includes: S103-3A and S103-3B, which are specifically illustrated as follows:

S103-3A, sorting counted attribute values in an ascending order; and

S103-3B, taking a color identification corresponding to a kth color block, from left to right, in the default color bar as the attribute color identification corresponding to a kth attribute value sorted in the ascending order.

With regard to the contents in S103-3, the embodiments of the present disclosure further provide an optional implementation mode. Referring to the following, when the pre-configured color bar rule is the default color bar rule, S103-3, the step of determining the attribute color identification of each geographical unit based on a pre-configured color bar rule and the attribute value of each geographical unit in the first attribute table, includes: S103-3C and S103-3D, which are specifically illustrated as follows:

S103-3C, sorting counted attribute values in an ascending order; and

S103-3D, allocating a corresponding attribute color identification to each sorted attribute value, wherein the corresponding attribute color identifications allocated to all attribute values belong to custom colors, and depths of the custom colors corresponding to the attribute values sorted in the ascending order are increased in sequence.

Optionally, the custom colors are selected by users, and in this case, the color bar is a gradient color bar.

S103-4, adding an attribute-color column into the first attribute table, and adding the attribute color identifications into the attribute-color column according to correspondence relationships, so as to obtain a second attribute table.

In the above, the attribute color identification in the attribute-color column corresponding to an ith row in the second attribute table is configured to replace the initial color identification in the first type of default column corresponding to the ith row.

Referring to TABLE 3 below, TABLE 3 is the second attribute table corresponding to the above TABLE 2.

TABLE 3

| | | | | | | | | | | |
|---|---|---|---|---|---|---|---|---|---|---|
| Jiayuguan City | 30 | 30 | 142 | 1E1E8E | 240 | 78 | 55 | 0 | 282 | FBDDC3 |
| Dingxi City | 39 | 171 | 70 | 27AB46 | 134 | 77 | 67 | 0 | 441 | EAAE8C |
| Linxia Hui Autonomous Prefecture | 41 | 135 | 163 | 2987A3 | 193 | 74 | 63 | 0 | 331 | F5CEAF |
| Jiuquan City | 42 | 80 | 129 | 2A5081 | 213 | 67 | 50 | 0 | 658 | D24533 |
| Qingyang City | 54 | 73 | 176 | 3649B0 | 230 | 69 | 69 | 0 | 755 | C71E17 |
| Pingliang City | 66 | 160 | 124 | 42A07C | 157 | 58 | 62 | 0 | 476 | DE7B5C |
| Lanzhou City | 67 | 128 | 59 | 43803B | 113 | 53 | 50 | 0 | 2887 | C40A0B |
| Wuwei City | 104 | 156 | 32 | 689C20 | 85 | 79 | 61 | 0 | 526 | D55740 |
| Longnan City | 109 | 64 | 129 | 6D4081 | 281 | 50 | 50 | 0 | 452 | E89F7E |
| Zhangye City | 134 | 70 | 42 | 86462A | 18 | 68 | 52 | 0 | 467 | E28B6D |
| Tianshui City | 140 | 32 | 32 | 8C2020 | 0 | 77 | 54 | 0 | 667 | CC3024 |
| Baiyin City | 154 | 32 | 151 | 9A2097 | 301 | 79 | 60 | 0 | 497 | D9674D |
| Gannan Tibetan Autonomous Prefecture | 161 | 141 | 46 | A18D2E | 49 | 71 | 63 | 0 | 359 | FFEBD6 |
| Jinchang City | 172 | 50 | 89 | AC3259 | 340 | 70 | 67 | 0 | 359 | F0BD9E |
| Legend Title | 3311 | 1368 | 3439 | 1946 | 0 | 0 | 0 | 0 | GDP (100 million yuan) | 000000 |
| Legend Color Bar | 3465 | 460 | 3648 | 2819 | 0 | 0 | 0 | 0 | 0 | 000000 |
| Legend Minimum-value Label | 3635 | 2822 | 3736 | 3002 | 0 | 0 | 0 | 0 | 219 | 000000 |
| Legend Maximum-value Label | 3638 | 417 | 482 | 3759 | 0 | 0 | 0 | 0 | 2887 | 000000 |

Optionally, an 11th column in the second attribute table is the attribute-color column. Hexadecimal color code identifications are used as the attribute color identifications in TABLE 3. Definitely, others, for example, RGB color identifications, may also be used, which is not limited herein.

In an optional implementation mode, colors of the legend title, minimum-value label and maximum-value label may be set as desired, black as default. If set, it only needs to assign new colors to the last four rows of the attribute-color column.

S104, replacing the initial color identification corresponding to each geographical unit in the map style master with the attribute color identification, and updating the legend, so as to obtain the thematic map of the original input data when aimed at the application field.

Optionally, the initial color identification corresponding to each geographical unit in the map style master is replaced with the attribute color identification in the same row, and the legend is updated based on information in the last four rows in the second attribute table, so as to obtain the thematic map of the original input data when aimed at the application field, and output an image file corresponding to the thematic map to a client terminal.

Figure 3:
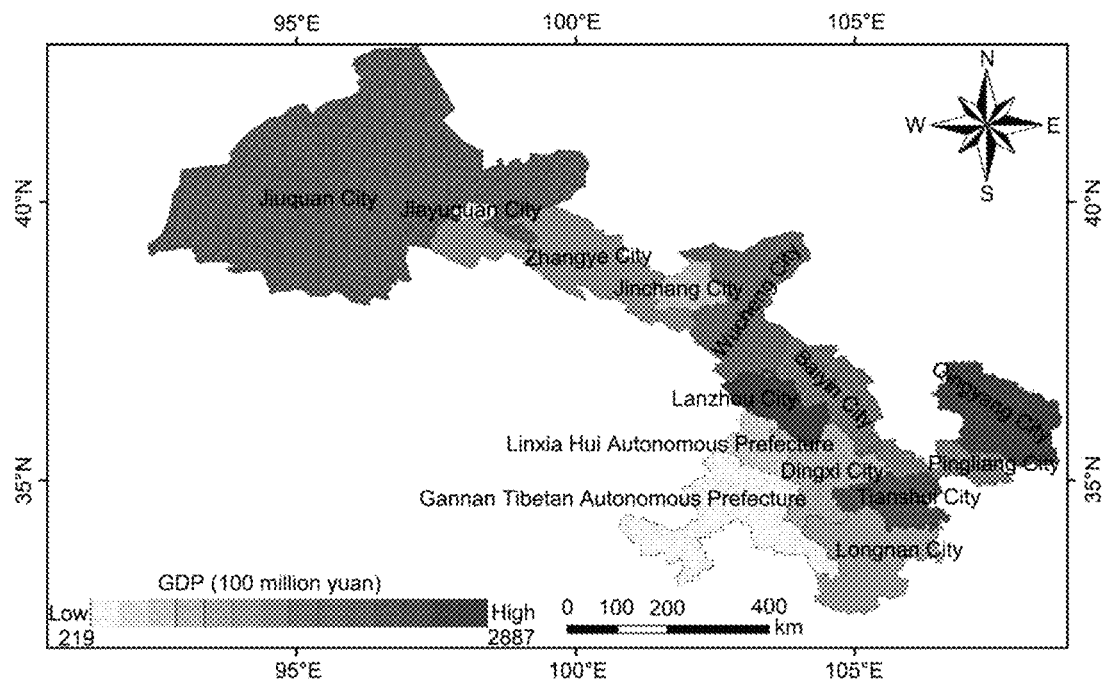
FIG. 3 is a schematic view of a thematic map provided in embodiments of the present disclosure.

Referring to FIG. 3, FIG. 3 is a schematic view of a thematic map provided in embodiments of the present disclosure.

In order to facilitate source tracing and observation, the embodiments of the present disclosure further provide an optional implementation mode. Referring to the following description, after S104, the thematic map preparation method further includes S105 and S106, which are specifically illustrated as follows:

S105, replacing the initial color identification in the first type of default column corresponding to the ith row with the attribute color identification in the attribute-color column in the second attribute table; and S106, deleting the attribute-color column and the attribute-value column in the second attribute table to render thematic map metadata, and outputting the same as a thematic map metadata file.

In the solutions of the present disclosure, data security can be protected by the thematic map metadata file, and it is also convenient to modify and update the thematic map later.

Referring to TABLE 4 below, TABLE 4 schematically shows the above TABLE 3 after the attribute-color column and the attribute-value column in the second attribute table are deleted.

TABLE 4

| | | | | | | | | |
|---|---|---|---|---|---|---|---|---|
| Jiayuguan City | 251 | 221 | 195 | FBDDC3 | 27 | 221 | 195 | 0 |
| Dingxi City | 234 | 174 | 140 | EAAE8C | 21 | 40 | 91 | 0 |
| Linxia Hui Autonomous Prefecture | 245 | 206 | 175 | F5CEAF | 26 | 28 | 96 | 0 |
| Jiuquan City | 210 | 69 | 51 | D24533 | 6 | 75 | 82 | 0 |
| Qingyang City | 199 | 30 | 23 | C71E17 | 2 | 88 | 78 | 0 |
| Pingliang City | 222 | 123 | 92 | DE7B5C | 14 | 58 | 87 | 0 |
| Lanzhou City | 196 | 10 | 11 | C40A0B | 359 | 94 | 76 | 0 |
| Wuwei City | 213 | 87 | 64 | D55740 | 9 | 69 | 83 | 0 |
| Longnan City | 232 | 159 | 126 | E89F7E | 18 | 45 | 90 | 0 |
| Zhangye City | 226 | 139 | 109 | E28B6D | 15 | 51 | 88 | 0 |
| Tianshui City | 204 | 48 | 36 | CC3024 | 4 | 82 | 80 | 0 |
| Baiyin City | 217 | 103 | 77 | D9674D | 11 | 64 | 85 | 0 |
| Gannan Tibetan Autonomous Prefecture | 255 | 235 | 214 | FFEBD6 | 30 | 16 | 100 | 0 |
| Jinchang City | 240 | 189 | 158 | F0BD9E | 22 | 34 | 94 | 0 |
| Legend Title | 3311 | 1368 | 3439 | 1946 | 0 | 0 | 0 | 0 |
| Legend Color Bar | 3465 | 460 | 3648 | 2819 | 0 | 0 | 0 | 0 |
| Legend Minimum-value Label | 3635 | 2822 | 3736 | 3002 | 0 | 0 | 0 | 0 |
| Legend Maximum-value Label | 3638 | 417 | 482 | 3759 | 0 | 0 | 0 | 0 |

The thematic map preparation method provided by the present disclosure performs mapping based on data fusion: the value of the existing data resources is fully exerted. Original data are firstly acquired from various data files to form an attribute table text file; and then information fusion is performed on the text file and image file to finally form the thematic map. Performing the mapping based on the map style master gets rid of excessive dependence on conventional cartographic environment, conditions and personnel, and also improves currency, objectivity, standardization and economy of the mapping, thus providing a solution for the automatic mass production of high-quality and standardized thematic map products.

Specifically, the thematic map preparation method with fusion of multi-source heterogeneous data in the present disclosure is a process of effectively fusing data resources of different sources and different types to generate fine, comprehensive and reliable thematic maps, effectively improves the data utilization rate and application effect, provides an effective technical solution for thematic map drawing under big data, and has the following unique advantages:

the present disclosure is capable of automated mapping, which gets rid of the dependence on the conventional cartographic environment and conditions, avoids interference of human factors, saves manpower and time cost, improves mapping efficiency, and supports actively, timely, effectively and continuously tracking, monitoring and studying automatic batch release of data expression of concerned themes.

The existing designs of map styles and data resources are fully utilized, thus avoiding resource wastes, meanwhile also improving the application value of data, and improving the utilization value of existing assets, and being extended to more application scenarios.

Self-adaptive mapping through a high-quality template library has good standardization and high flexibility, thus reducing repeated labor, ensuring drawing of high-quality, high-standard thematic maps, and having unique advantages in reliability, consistency, comparability, currency and continuity. As mapping framework is uniform, problems can be better learnt and analyzed.

The mapping mode of data fusion in the present disclosure supports cross-field and cross-department collaboration, makes full use of the advantages of multi-source data, ensures standardization and accuracy of thematic maps, promotes data sharing and application, and enhances communication and cooperation of personnel.

The mechanism of separation and cooperation of data and template in the present disclosure guarantees interests of each department, protects data security, enables smoother information circulation and more efficient collaboration between various departments, promotes release of data value, and pushes forward the development and progress of technologies of the cartographic industry in the big data environment.

Figure 4:
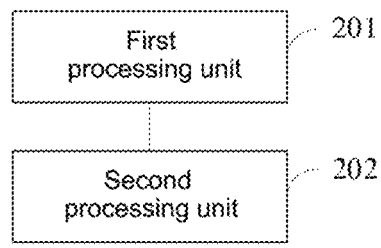
FIG. 4 is a schematic view of units of a thematic map preparation apparatus provided in embodiments of the present disclosure.

Referring to FIG. 4, FIG. 4 shows a thematic map preparation apparatus provided in embodiments of the present disclosure. Optionally, the thematic map preparation apparatus is applied to the electronic device described above.

The thematic map preparation apparatus includes: a first processing unit 201 and a second processing unit 202.

The first processing unit 201 is configured to prepare a map style master based on an aimed application field.

In the above, the map style master includes at least one geographical unit in a target region corresponding to the application field and a legend, wherein initial color identifications corresponding to different geographical units in the map style master are different.

The first processing unit 201 is further configured to generate metadata information corresponding to the map style master.

In the above, the metadata information includes a mapping relationship between each geographical unit in the map style master and the initial color identification corresponding thereto, and the metadata information further includes location information about the legend in the map style master.

The first processing unit 201 is further configured to process original input data, and acquire an attribute color identification of each of the geographical units in the original input data.

In the above, the attribute color identifications are reference objects corresponding to the application field.

The second processing unit 202 is configured to replace the initial color identification corresponding to each geographical unit in the map style master with the attribute color identification, and update the legend, so as to obtain the thematic map of the original input data when aimed at the application field.

Optionally, the first processing unit 201 may execute the above S101-S103, and the control unit 202 may execute the above S104-S105.

It should be indicated that the thematic map preparation apparatus provided in the present embodiment may execute method flows shown in the above method flow embodiments, so as to achieve corresponding technical effects. For brief description, for parts not mentioned in the present embodiment, reference can be made to corresponding contents in the above embodiments.

Embodiments of the present disclosure further provide a storage medium, wherein the storage medium stores a computer instruction and a program, and when the computer instruction and program are read and run, the above thematic map preparation method in the above embodiments is executed. The storage medium may include an internal storage, a flash memory, a register, a combination thereof, or the like.

An electronic device is provided below, which may be a server device, a computer device, a mobile phone device, and other terminal devices having computing and processing capabilities. The electronic device, as shown in FIG. 1, can implement the above thematic map preparation method. Specifically, the electronic device includes a processor 10, a memory 11, and a bus 12. The processor 10 may be a CPU. The memory 11 is configured to store one or more programs, and when the one or more programs are executed by the processor 10, the thematic map preparation method in the above embodiments is implemented.

To sum up, the embodiments of the present disclosure provide the thematic map preparation method and apparatus, the storage medium and the electronic device. The method includes: preparing a map style master based on an aimed application field, wherein the map style master includes at least one geographical unit in a target region corresponding to the application field and a legend, and different geographical units in the map style master are corresponding to different initial color identifications; generating metadata information corresponding to the map style master, wherein the metadata information includes a mapping relationship between each geographical unit in the map style master and the initial color identification corresponding thereto, and the metadata information further includes location information about the legend in the map style master; processing original input data, and acquiring an attribute color identification of each geographical unit in the original input data, wherein the attribute color identifications are reference objects corresponding to the application field; and replacing the initial color identification corresponding to each geographical unit in the map style master with the attribute color identification, and updating the legend, so as to obtain the thematic map of the original input data when aimed at the application field. The present disclosure reduces repeated labor, ensures drawing of high-quality and high-standard thematic maps, and has unique advantages in reliability, consistency, comparability, currency and continuity.

The above-mentioned are merely for preferred embodiments of the present disclosure, but are not used to limit the present disclosure. For those skilled in the art, various modifications and changes could be made to the present disclosure. Any modifications, equivalent substitutions, improvements and so on made within the spirit and principle of the present disclosure should be covered within the scope of protection of the present disclosure.

For those skilled in the art, the present disclosure obviously is not limited to details of the above exemplary embodiments, and the present disclosure could be implemented in other specific forms, without departing from the spirit or basic characteristics of the present disclosure. Thus, no matter from which point of view, the embodiments should be regarded as exemplary and non-limiting, and the scope of the present disclosure is defined by the appended claims rather than the above description. Therefore, all changes falling within the meaning and scope of equivalents of the claims are intended to be covered within the present disclosure. Reference signs in the claims should not be regarded as limiting the claims involved.

What is claimed is:

1. A thematic map preparation method, comprising steps of:

preparing a map style master based on an aimed application field,
wherein the map style master comprises at least one geographical unit in a target region corresponding to the application field and a legend, and initial color identifications corresponding to different geographical units in the map style master are different;

generating metadata information corresponding to the map style master,
wherein the metadata information comprises a mapping relationship between each of the geographical units in the map style master and the initial color identification corresponding thereto, and the metadata information further comprises location information about the legend in the map style master;

processing original input data, and acquiring an attribute color identification of each of the geographical units in the original input data,
wherein the attribute color identifications are reference objects corresponding to the application field; and replacing the initial color identification corresponding to each of the geographical units in the map style master with the attribute color identification, and updating the legend, so as to obtain a thematic map of the original input data when aimed at the application field, wherein a total number of the geographical units in the target region is N, where N≥1, the metadata information is a metadata table, a first type of default column corresponding to first N rows in the metadata table is configured to store mapping relationships between initial color identifications of N geographical units, and name column of an ith row in the metadata table comprises an identification of corresponding geographical unit, where 1≤i≤ N; a second type of default column corresponding to last four rows in the metadata table is configured to store the location information about the legend in the map style master;

the step of processing original input data and acquiring an attribute color identification of each of the geographical units in the original input data comprises: processing the original input data, and acquiring an attribute value of each of the geographical units in the original input data, wherein the attribute values are reference values corresponding to the application field; adding an attribute-value column into the metadata table, and adding the attribute values into the attribute-value column according to correspondence relationships, so as to obtain a first attribute table; determining the attribute color identification of each of the geographical units based on a pre-configured color bar rule and the attribute value of each of the geographical units in the first attribute table; and adding an attribute-color column into the first attribute table, and adding the attribute color identifications into the attribute-color column according to correspondence relationships, so as to obtain a second attribute table, wherein the attribute color identification in the attribute-color column corresponding to an ith row in the second attribute table is configured to replace the initial color identification in the first type of default column corresponding to the ith row;

after the step of replacing the initial color identification corresponding to each of the geographical units in the map style master with the attribute color identification and updating the legend so as to obtain a thematic map of the original input data when aimed at the application field, the method further comprises: replacing the initial color identification in the first type of default column corresponding to the ith row with the attribute color identification in the attribute-color column in the second attribute table; and deleting the attribute-color column and the attribute-value column in the second attribute table to render thematic map metadata, and outputting the same as a thematic map metadata file.

2. The thematic map preparation method according to claim 1, wherein the legend comprises a legend title, a legend label and a color bar.

3. The thematic map preparation method according to claim 1, wherein when the pre-configured color bar rule is a default color bar rule, the step of determining the attribute color identification of each of the geographical units based on a pre-configured color bar rule and the attribute value of each of the geographical units in the first attribute table comprises:
   sorting the attribute values counted in an ascending order; and
   taking a color identification corresponding to a kth color block, from left to right, in a default color bar as the attribute color identification corresponding to a kth attribute value sorted in the ascending order.

4. The thematic map preparation method according to claim 1, wherein when the pre-configured color bar rule is a custom color bar rule, the step of determining the attribute color identification of each of the geographical units based on a pre-configured color bar rule and the attribute value of each of the geographical units in the first attribute table comprises:
   sorting the attribute values counted in an ascending order; and
   allocating corresponding attribute color identification to each sorted attribute value, wherein the corresponding attribute color identifications allocated to all attribute values belong to custom colors, and depths of the custom colors corresponding to the attribute values sorted in the ascending order are increased in sequence.

5. A non-transitory computer-readable storage medium, storing a computer program thereon, wherein the computer program, when executed by a processor, implements the method according to claim 1.

6. An electronic device, comprising: a processor and a memory, wherein the memory is configured to store one or more programs; and the one or more programs, when executed by the processor, implements the method according to claim 1.

7. The computer-readable storage medium according to claim 5, wherein the legend comprises a legend title, a legend label and a color bar.

8. The computer-readable storage medium according to claim 5, wherein when the pre-configured color bar rule is a default color bar rule, the step of determining the attribute color identification of each of the geographical units based on a pre-configured color bar rule and the attribute value of each of the geographical units in the first attribute table comprises:
   sorting the attribute values counted in an ascending order; and
   taking a color identification corresponding to a kth color block, from left to right, in a default color bar as the attribute color identification corresponding to a kth attribute value sorted in the ascending order.

9. The computer-readable storage medium according to claim 5, wherein when the pre-configured color bar rule is a custom color bar rule, the step of determining the attribute color identification of each of the geographical units based on a pre-configured color bar rule and the attribute value of each of the geographical units in the first attribute table comprises:
   sorting the attribute values counted in an ascending order; and
   allocating corresponding attribute color identification to each sorted attribute value, wherein the corresponding attribute color identifications allocated to all attribute values belong to custom colors, and depths of the custom colors corresponding to the attribute values sorted in the ascending order are increased in sequence.

10. The electronic device according to claim 6, wherein the legend comprises a legend title, a legend label and a color bar.

11. The electronic device according to claim 6, wherein when the pre-configured color bar rule is a default color bar rule, the step of determining the attribute color identification of each of the geographical units based on a pre-configured color bar rule and the attribute value of each of the geographical units in the first attribute table comprises:
   sorting the attribute values counted in an ascending order; and
   taking a color identification corresponding to a kth color block, from left to right, in a default color bar as the attribute color identification corresponding to a kth attribute value sorted in the ascending order.

12. The electronic device according to claim 6, wherein when the pre-configured color bar rule is a custom color bar rule, the step of determining the attribute color identification of each of the geographical units based on a pre-configured color bar rule and the attribute value of each of the geographical units in the first attribute table comprises:
   sorting the attribute values counted in an ascending order; and
   allocating corresponding attribute color identification to each sorted attribute value, wherein the corresponding attribute color identifications allocated to all attribute values belong to custom colors, and depths of the custom colors corresponding to the attribute values sorted in the ascending order are increased in sequence.

\* \* \* \* \*

UNITED STATES PATENT AND TRADEMARK OFFICE
CERTIFICATE OF CORRECTION

| | | |
|---|---|---|
| PATENT NO. | : 12,182,907 B1 | Page 1 of 1 |
| APPLICATION NO. | : 18/798947 | |
| DATED | : December 31, 2024 | |
| INVENTOR(S) | : Guohui Zhao and Yaonan Zhang | |

It is certified that error appears in the above-identified patent and that said Letters Patent is hereby corrected as shown below:

On the Title Page

Add Item (30), after Item (22):
August 11, 2023     (CN) ........................2023110141151

Signed and Sealed this
Twentieth Day of May, 2025

Coke Morgan Stewart
*Acting Director of the United States Patent and Trademark Office*